United States Patent
Shaffer

(10) Patent No.: US 7,195,379 B2
(45) Date of Patent: Mar. 27, 2007

(54) ANTI-BLINDING SYSTEM FOR A VEHICLE

(75) Inventor: Aric Shaffer, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 10/905,407

(22) Filed: Jan. 3, 2005

(65) Prior Publication Data
US 2006/0146552 A1    Jul. 6, 2006

(51) Int. Cl.
*F21V 1/00* (2006.01)
*B60Q 21/28* (2006.01)

(52) U.S. Cl. ............... 362/465; 362/466; 340/555; 340/903; 180/167

(58) Field of Classification Search ............. 362/464, 362/465, 466; 180/167, 169; 348/148, 149, 348/162, 164, 169; 340/425.5, 435, 436, 340/555, 556, 557
See application file for complete search history.

(56) References Cited

U.S. PATENT DOCUMENTS

| 4,768,135 | A | * | 8/1988 | Kretschmer et al. ........ 362/466 |
| 5,936,319 | A | * | 8/1999 | Chitayat ...................... 310/12 |
| 6,967,569 | B2 | * | 11/2005 | Weber et al. ................ 340/436 |
| 2005/0206727 | A1 | * | 9/2005 | Kormos ....................... 348/148 |

* cited by examiner

*Primary Examiner*—John Anthony Ward
(74) *Attorney, Agent, or Firm*—Frank A. MacKenzie

(57) ABSTRACT

An active light source operating system (10,11) for a vehicle (14) includes a light source (50) that generates an initial illumination beam (54). A selective attenuation filter (27,52) forms an emitted illumination beam (56), with an associated light attenuation matrix (32,33), in response to the initial illumination beam (54). A sensor (31) detects an object and generates an object detection signal. A controller (35) is coupled to the selective attenuation filter (27,52) and said sensor (31). The controller (35) attenuates a pixel (104) in the light attenuation matrix (32,33) in response to the object detection signal.

20 Claims, 3 Drawing Sheets

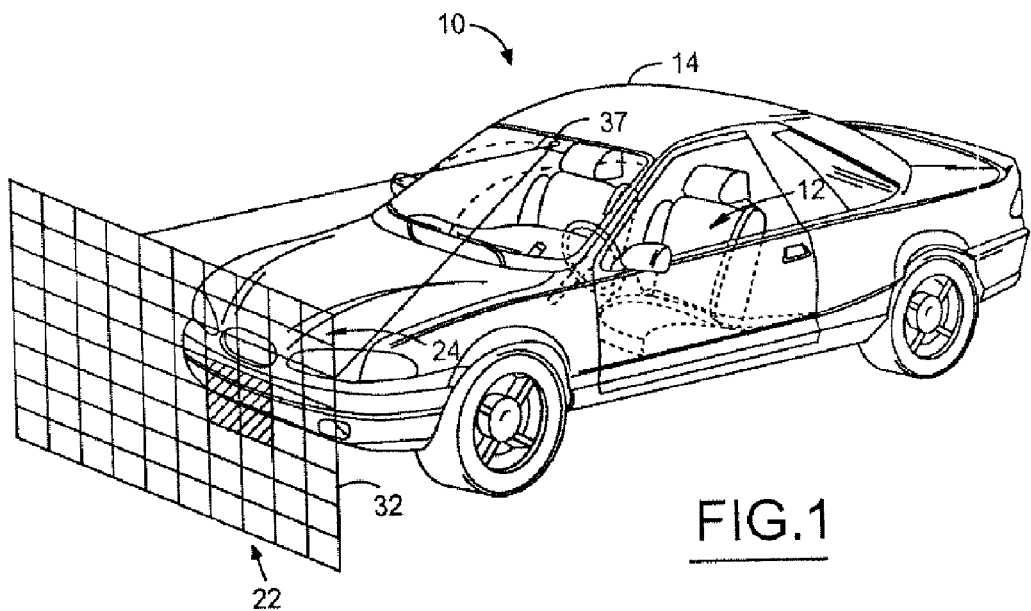
FIG.1
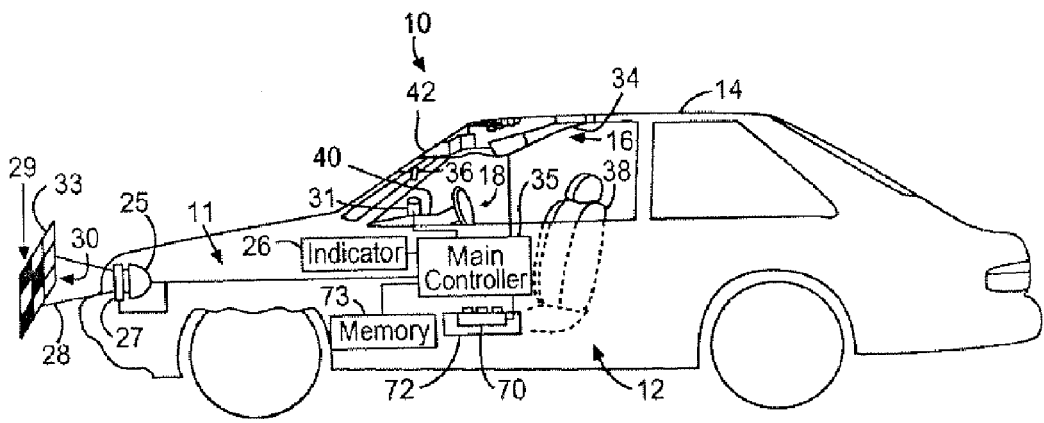
FIG.2
FIG.4
FIG.5

ANTI-BLINDING SYSTEM FOR A VEHICLE

TECHNICAL FIELD

The present invention relates to night vision systems. More particularly, the present invention is related to an active system and method of illuminating selected areas external to a vehicle and illuminating the areas with an appropriate level of illumination.

BACKGROUND OF THE INVENTION

Night vision systems allow a vehicle occupant to better see objects during relatively low visible light level conditions, such as at nighttime. Night vision systems typically are classified as either passive night vision systems or active night vision systems. Passive systems simply detect ambient infrared light emitted from the objects within a particular environment. Active systems utilize a near infrared (NIR) light source to illuminate a target area and subsequently detect the NIR light reflected off objects within that area.

Active systems provide improved resolution and image clarity over passive systems. Active systems utilize laser or incandescent light sources to generate an illumination beam in the near infrared spectral region and charge-coupled devices or CMOS cameras to detect the reflected NIR light.

In an active night vision system a NIR laser is used to illuminate a target area. A camera is used in conjunction with the laser to receive the reflected NIR light from objects within the target area. The laser may be pulsed with a duty cycle and the camera may be operated in synchronization with the laser to capture an image.

The camera typically contains a band-pass filter that allows passage of light that is within a narrow range or band, which includes the wavelength of the light generated by the laser. The combination of the duty cycle and the use of the band-pass filter effectively eliminates the blinding effects associated with headlamps of oncoming vehicles. The term "blinding effects" refers to when pixel intensities are high due to the brightness of the oncoming lights, which causes an image to be "flooded out" or have large bright spots such that the image is unclear. However, the use of a laser and a corresponding filter can add costs and complexity to a night vision system. In addition to the laser and filter component costs and added circuit complexity, there are costs and added complexity associated with the thermal control of the laser. The wavelength of a laser is temperature dependent. In order to maintain a laser within a desired operating band, the temperature of the laser must be maintained. Moreover, a laser based night vision system also uses a fan optic, to shape and create an effective laser dispersion pattern, which can further add costs.

Also, although laser-based night vision systems can overcome the blinding effects of oncoming headlamps, they cannot overcome the blinding effects associated with highly reflective objects. For example, many signs have highly reflective surfaces for reflection of incandescent light, such as that emitted from vehicle headlamps, for direct viewing ease by a vehicle operator. The signs are often covered with retroreflective paint that can reflect a large amount of light and cause image saturation. A saturated image is generally unclear and unreadable. Large flat surfaces, such as on trucks, buses, and vans, can also cause image saturation.

In addition to the blinding effects of oncoming headlamps on a night vision system, oncoming headlamps can also degrade human vision of a vehicle operator. Illumination from oncoming headlamps that is directed at a host vehicle can obstruct the vision of a vehicle operator limiting the view of the roadway ahead of the host vehicle.

Although the headlamps of a vehicle when operated in "high-beam" mode in general provide a clearer view of the roadway ahead, high-beam mode operation can further obstruct the vision of an oncoming vehicle. As a result, high-beam mode operation is limited to instances when oncoming vehicles are not present. By only operating the headlamps when oncoming vehicles are not present, the host vehicle operator vision is also limited during oncoming vehicle instances when high-beam operation may be desired.

Thus, there exists a need for an improved active night vision system and method that prevents blinding of night vision system components and limits the directing of light at an oncoming vehicle. It is also desirable that the active night vision system and method provide reduced system complexity and costs and provide increased safety associated with vehicle operation.

SUMMARY OF THE INVENTION

One embodiment of the present invention provides an active light source operating system for a vehicle. The system includes a light source that generates an initial illumination beam. A selective attenuation filter forms an emitted illumination beam, with an associated light attenuation matrix, in response to the initial illumination beam. A sensor detects an object and generates an object detection signal. A controller is coupled to the selective attenuation filter and the sensor. The controller attenuates a pixel in the light attenuation matrix in response to the object detection signal.

Another embodiment of the present invention provides a vision system for a vehicle that includes a light source, which generates an initial illumination beam. A selective attenuation filter forms an emitted illumination beam with an associated light attenuation matrix in response to the initial illumination beam. A receiver generates an environmental status signal in response to a reflected portion of the emitted illumination beam. A controller actively controls the operation of the selective attenuation filter and generates an image in response to the environmental status signal.

The embodiments of the present invention provide several advantages. One such advantage is the provision of a night vision system that utilizes a selective attenuation filter to illuminate selected areas forward of a vehicle. In so doing, the present invention eliminates the need for utilizing a laser, a fan optic, and other thermal control and filter control electronics commonly associated with such devices. Thus, night vision system costs and complexity are reduced.

Another advantage that is provided by an embodiment of the present invention is the provision of selectively illuminating areas forward of a vehicle utilizing illumination generated from the headlamps of a vehicle or from the laser of a night vision system. The present invention prevents the directing of an illumination beam and/or provides the attenuation of selected portions of the illumination beam that are directed at nearby vehicles and objects. This prevents degradation to or obstruction of the field-of-view of a nearby vehicle operator or pedestrian. This selective illumination also: minimizes the field-of-view degradation due to the reflection of illumination beams through side view or rear view mirrors of a vehicle; allows the headlamps of a vehicle to continuously be operated in a "high-beam" mode without degradation to the field-of-view of an oncoming vehicle operator; and prevents the blinding of oncoming vehicle night vision systems.

Furthermore, the present invention provides an active night vision system that is inexpensive, versatile, and robust. The present invention also increases vehicle-operating safety by providing an improved view of an operating environment for both a host vehicle and any vehicles detected by the host vehicle.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein:

FIG. 1 is a front perspective view of an active night vision system in accordance with an embodiment of the present invention.

FIG. 2 is a side perspective and block diagrammatic view of the active night vision system and an active headlamp operating system in accordance with an embodiment of the present invention.

FIG. 4 is a block diagrammatic view of a receiver system in accordance with an embodiment of the present invention.

FIG. 5 is a projection diagram illustrating an illumination pattern associated with a light attenuation matrix of a selective attenuation filter in accordance with embodiments of the present invention.

DETAILED DESCRIPTION

Figure 3:
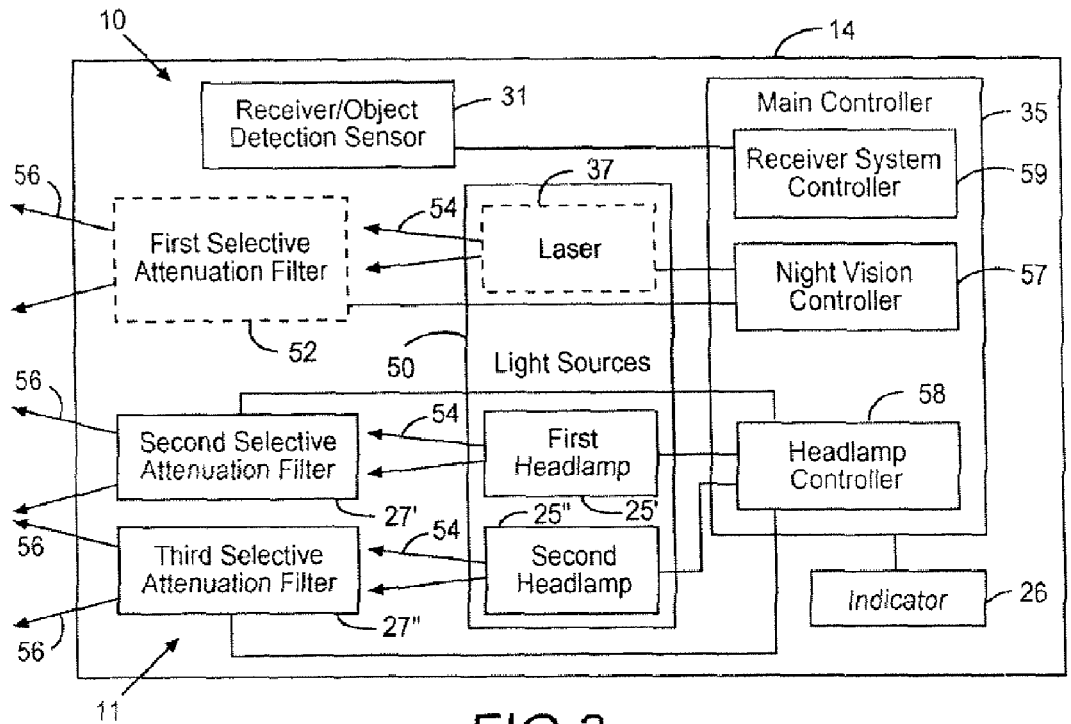
FIG. 3 is a block diagrammatic view of the active night vision system and active headlamp operating system in accordance with multiple embodiments of the present invention.

In the following figures the same reference numerals will be used to refer to the same components. While the present invention is described with respect to a system and method of actively attenuating selected portions of illumination beams of an active night vision system and an active headlamp system, the present invention may be applied in various applications and systems, such as near infrared imaging applications, adaptive cruise control applications, collision avoidance and countermeasure systems, image processing systems, back-up lighting system, and other lighting, imaging, and object detection systems where attenuation of selected portions of an illumination beam is desired. The present invention may be applied in various types and styles of vehicles as well as in non-vehicle applications.

Also, although the present invention is primarily described with respect an active night vision system illumination source and to headlamps of a vehicle, the present invention may be applied to any light source on a vehicle and to light sources that generate illumination beams which are directed within or exterior to a vehicle.

In the following description, various operating parameters and components are described for one constructed embodiment. These specific parameters and components are included as examples and are not meant to be limiting.

Additionally, in the following description the term "near infrared light" refers to light having wavelengths within the 750 to 1000 nm spectral region. The term also at least includes the spectrum of the near infrared light output by the particular illumination sources disclosed herein.

Referring now to FIGS. 1 and 2, front and side perspective views of an active night vision system 10 and a side perspective view of an active headlamp operating system 11 are shown in accordance with an embodiment of the present invention. The vision system 10 is configured for an interior passenger cabin 12 of a host vehicle 14. The vision system 10 may include a night vision illumination system 16. The night vision illumination system 16 generates a first illumination beam 20 having a first beam pattern 22, which is directed towards a first target area 24 that is forward of the vehicle 10. The headlamp operating system 11 includes one or more headlamps (only one is shown in FIG. 2) 25 and corresponding area selective attenuation filters (only one is shown in FIG. 2) 27. The headlamp operating system 11 generates a second illumination beam 28 having a second beam pattern 29, which is also directed at a second target area 30 forward of the vehicle 14. The active night vision system 10 may instead of using the night vision illumination system 16 utilize the headlamps 25. The selective attenuation filters 27 are utilized to actively attenuate light directed at select areas forward of the vehicle 14 where less illumination is desired.

Portions of the beams 20 and 28 are reflected off objects (not shown) within the target areas 24 and 30 and may be received by the receiver system 18, via a receiver/object detection sensor 31. The receiver system 18 indicates to vehicle occupants, via an indicator 26, detection of the objects in response to reflected portions of the beams 20 and 28. The receiver system 18 generates environmental status signals from which active night vision images of one or more of the target areas 24 and 30 may be generated. The images are displayed via the indicator 26.

A main controller 35 is coupled to the night vision illumination system 16, the headlamps 25, and the selective attenuation filters 27. The controller determines pixels within light attenuation matrices 32 and 33, respectively, to attenuate and the attenuation levels thereof.

The night vision illumination system 16 is configured such that portions thereof are mounted within an overhead console 34, such as the night vision light source 37, above a rearview mirror 36, and the receiver system 18 is configured to be mounted forward of a driver seat 38 on a dashboard 40. Of course, the illumination system 16 and the receiver system 18 may be mounted in other locations around the windshield 42 as well as other window and non-window locations within the vehicle 14.

Referring also to FIG. 3, a block diagrammatic view of the active night vision system 10 and active headlamp operating system 11 in accordance with multiple embodiments of the present invention is shown. Both the night vision system 10 and the headlamp operating system 11 include one or more of the light sources 50 and the main controller 35. The night vision system 10 may include the night vision or first light source 37, which may be in the form of a laser as shown, and a first selective attenuation filter 52. On the other hand, the night vision system in addition or as an alternative to using the first light source 37 and first attenuation filter 52 may utilize the second light source 25', the third light source 25", the second selective attenuation filter 27', and the third selective attenuation filter 27". The light sources 25' and 25" and the filters 27' and 27" are part of the headlamp system 11. Although the light sources 25' and 25" are shown as headlamps, they may be in some other form known in the art.

Figure 6:
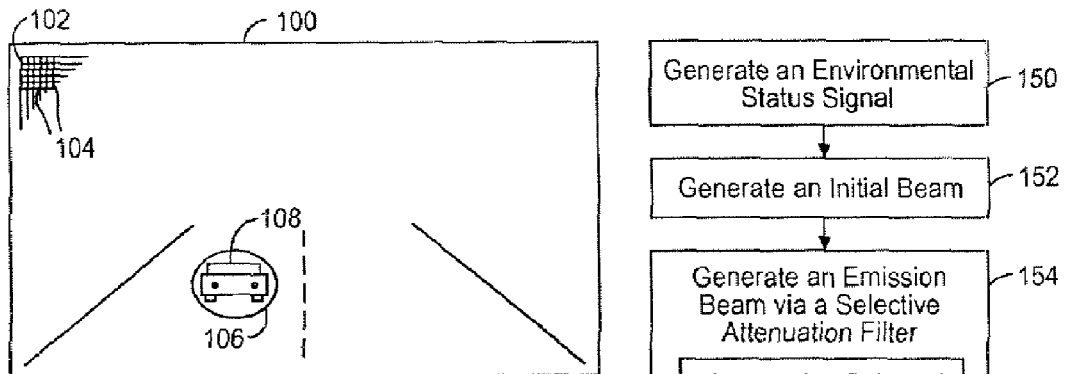
FIG. 6 is a sample field-of-view of a host vehicle illustrating an overlaid simulated pixel matrix in accordance with embodiments of the present invention.

Each light source 50 generates an initial illumination beam 54, which is passed through one of the associated filters 27', 27", and 52 to generate emitted beams 56 having desired attenuation patterns, such as that shown in FIGS. 1, 2, and 6. The lights sources 50 may be in the form of lasers, diode lasers, or headlamps, as indicated, or may be in the form of back-up lights, indicators, driving lights, or other lights known in the art. Light from any of the lights sources 50 may be passed through or reflected off of an optical coupler (not shown), such as a fiber optic cable or a series of mirrors, or reflected or transmitted via some other light-coupling device known in the art.

The main controller 35 may be a single controller or divided into multiple controllers. The main controller may include a night vision controller 57, a headlamp controller 58, and a receiving system controller 59. The night vision controller 57 in response to reflected signals received from the receiver 31 generates images of a surrounding environment of the vehicle 14. The reflected signals are generated from the reflected and received portions of any of the emission beams 56.

The headlamp controller 58 controls the emission pattern of the headlamps 25, such that the headlamps may be continuously operated in a "high-beam" mode. The term "high-beam" refers to an elevated or increased illumination state in which the headlamps are providing an increased level of illumination such that the illuminated area of concern or portions thereof are brighter than when operating in a normal operating mode.

The main controller 35 may be microprocessor based such as a computer having a central processing unit, memory (RAM and/or ROM), and associated input and output buses. The main controller 35 may be an application-specific integrated circuit or may be formed of other logic devices known in the art. The main controller 35 may be a portion of a central vehicle main control unit, an interactive vehicle dynamics module, a restraints control module, a main safety controller, a control circuit having a power supply, combined into a single integrated controller, or may be a stand-alone controller as shown.

The filters 27', 27", and 52 may be in the form of a liquid crystal display (LCD), a digital light projection (DLP) device, a liquid crystal on silicon (LCOS) device, or some other similar light attenuation and emission controlling device known in the art, such as scanning laser. Scanning laser provides a similar matrix to that described herein where a single emitter generates a beam that is passed or controlled by mechanically moving reflective devices to generate the matrix. The beam is deflected and scans the horizontal and vertical directions in a controlled manner. Note that the present invention is not limited to the filters mentioned above, other filters known in the art may be utilized. The filters 27', 27", and 52 may include polarizers, micro mirrors, logic circuits or chips, or other devices that can be used to adjust pixel transmission and projection.

The indicator 26 may include a video system, an audio system, a heads-up display, a flat-panel display, a telematic system or other indicator known in the art. In one embodiment of the present invention, the indicator 26 is in the form of a heads-up display and the indication signal is a virtual image projected to appear forward of the vehicle 14. The indicator 26 provides a real-time image of the target area to increase the visibility of the objects during relatively low visible light level conditions without having to refocus ones eyes to monitor a display screen within the interior cabin 12.

The receiver 31 may be used to detect vehicles in proximity with the host vehicle 14. The receiver 31 may be in the form of an infrared sensor, a radar sensor, an ultrasonic sensor, a lidar sensor, a camera, vehicle-to-vehicle telematic communication, or other environment sensor known in the art or a combination thereof. The receiver 31 may also be in the form of an illumination sensor and may be used to detect illumination of the target areas 24 and 30. The receiver 31 may be configured to be sensitive to incandescent light and/or infrared light and the reflection thereof off of objects. Sensor 31 may be more sensitive to reflected light produced from an incandescent light source, such as a headlamp, than that of a human eye and thus provide an image of an environment containing information undetected by a human eye.

The main controller 35 may be coupled to vision system controls 70, as are shown in FIG. 2, which are mounted on a center console 72. The system controls 70 may include activation switches, a light coupler position adjuster, an illumination beam brightness control, as well as other controls known in the art.

A memory 73 may be utilized to store algorithms, tables, formulas, or other conversion method or devices that may be utilized by the main controller 35 in generating image signals. The memory 73 may be in various forms and styles known in the art and may be part of the main controller 35.

Referring now to FIG. 4, a block diagrammatic view of the receiver system 18 in accordance with an embodiment of the present invention is shown. The receiver system 18 includes a receiver assembly 74 having a receiver 76, a filter 78, a lens 80, and a receiver system controller 59.

The receiver 76 may be in the form of a charge-coupled device (CCD) or a complementary metal oxide semiconductor (CMOS) sensor. A camera such as Model No. Wat902HS manufactured from Watec America Corporation of Las Vegas, Nev. may, for example, be used as the receiver assembly 74. Near infrared or incandescent light is reflected off objects and is received by the receiver 76 to generate the reflected signals.

The filter 78 is used to filter the light entering the camera. The filter 78 may be an optical band-pass filter that allows light, within a near infrared light spectrum, to be received by the receiver 76. The filter 78 prevents blooming caused by the lights of oncoming vehicles or objects. The filter 78 may be separate from the lens 80 and the receiver 76, as shown, or may be in the form of a coating on the lens 80 or a coating on a lens of the receiver 76, when applicable. The filter 78 may be a multistack optical filter located within the receiver 76.

Also, the filter 78 is positioned between the lens 80 and the receiver 76 to prevent the presence of undesirable ghost or false images. When the filter 78 is positioned between the lens 80 and the receiver 76 the light received by the lens 80 is incident upon the filter 78 over a range of angles determined by the lens 80.

Referring now to FIG. 5, a projection diagram illustrating an illumination pattern 90 associated with a light attenuation matrix 92 of a selective attenuation filter 94 in accordance with embodiments of the present invention is shown. The light attenuation matrix illustrates attenuated portions 96 of an illumination beam 98.

Referring now to FIG. 6, a sample field-of-view 100 of a host vehicle illustrating an overlaid simulated pixel matrix 102 in accordance with embodiments of the present invention is shown. The filters 27', 27", and 52 above may have a pixel matrix, such as the matrix 102 (only a portion of which is shown). The main controller 35 may select pixels 104 within the pixel matrix to attenuate. This allows the controller 35 to attenuate illumination beam portions directed at an area, such as area 106, around a target object or vehicle 108. The controller 35 may attenuate portions of the area 106 or the whole area 106.

Figure 7:
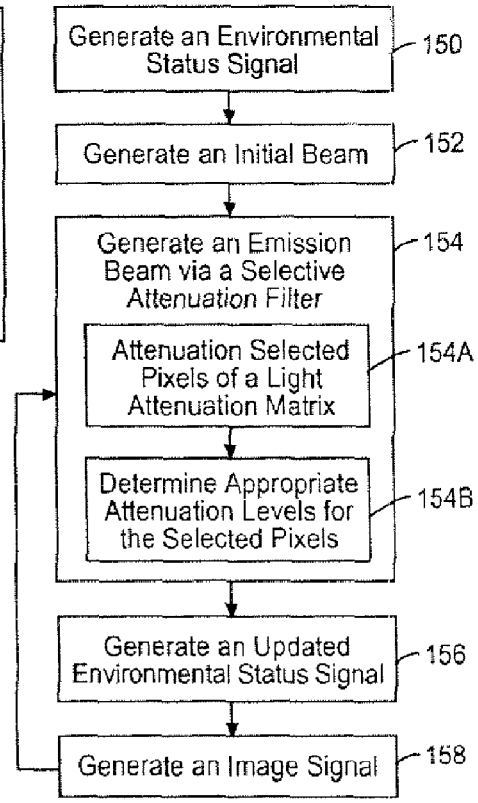
FIG. 7 is a method of actively controlling illumination sources of a vehicle in accordance with embodiments of the present invention.
Figure 8:
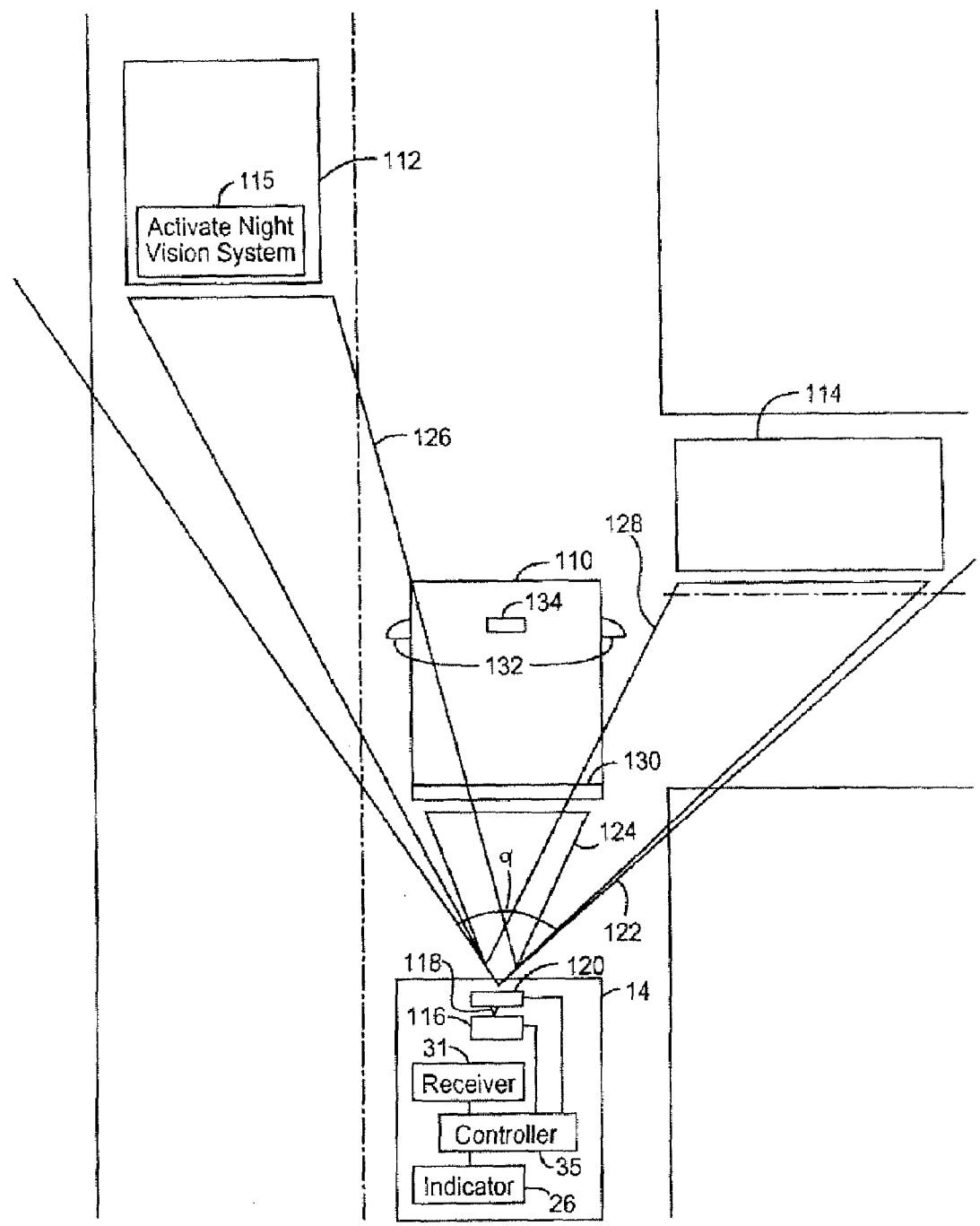
FIG. 8 is a block diagrammatic top view of a host vehicle utilizing an active night vision system or a headlamp operating system in accordance with multiple embodiments of the present invention.

Referring now to FIGS. 7 and 8, a method of actively controlling illumination sources of a vehicle and a block diagrammatic top view of the host vehicle 14 utilizing the active night vision system 10 or the headlamp operating system 11 in accordance with embodiments of the present invention are shown. In the example shown, the host vehicle 14 is following a first target vehicle 110, is approaching an oncoming or second target vehicle 112, and is proximate a third target vehicle 114. The second target vehicle has an active night vision system 115.

In step 150, the receiver 31 generates an object detection signal or an environmental status signal in response to received light reflected off of objects, such as vehicles 110, 112, and 114, within an environment of the host vehicle 14.

In step 152, an initial illumination beam is generated by a light source, such as one or more of the light sources 50, in response to the environmental status signal. For example, the light source 116 generates an initial beam 118. The light source, as stated above, may be a headlamp. A laser may not be utilized.

In step 154, an emitted illumination beam is formed from the initial illumination beam via a selective attenuation filter, such as one of the filters 27', 27", or 52. The selective attenuation filter 120 has an associated light attenuation matrix, such as the matrix 92, which is used to form the emission beam 122 with a spread angle α.

In step 154A, a controller, such as the main controller 35, via the selective attenuation filter attenuates selected pixels of the light attenuation matrix associated with the detected objects of concern. A pattern of attenuated and non-attenuated pixels on the light attenuation matrix is formed, which is projected at the objects and surrounding areas.

In step 154B, the controller determines the appropriate attenuation level for the stated pixels. The controller, for example, may select a high attenuation level for pixels associated with the oncoming vehicle 112 and may select a moderate attenuation level for pixels associated with other nearby vehicles, such as vehicles 110 and 114. The controller 35 attenuates selected portions of the beam 122 to prevent disturbing of the field-of-view of the operators of the vehicles 110, 112, and 114. The controller may adjust attenuation levels in response to any detected object. Regions 124, 126, and 128, respectively, of the emission beam 122 are attenuated with the desired levels of attenuation.

The controller may attenuate pixels associated with highly reflective objects, such as a vehicle bumper 130, side view mirrors 132, and rear view mirror 134 of vehicle 110. This can prevent degradation and/or obstruction to the field-of-view of the vehicle operators of both vehicles 14 and 110 due to the reflection of an illumination beam on the mirrors.

In step 156, the receiver generates an updated environmental status signal or reflected signal in response to reflected portions of the emitted illumination beam.

In step 158, the controller generates an image signal in response reflected signals. Upon completion of step 158 the controller returns to step 154 to actively adjust pixel attenuation of the pixel matrix in response to the image signal. The image signal may be displayed via the indicator 26.

The above-described steps are meant to be illustrative examples; the steps may be performed sequentially, synchronously, simultaneously, or in a different order depending upon the application.

The above-described method minimizes saturation of images due to the proximity of highly reflective objects within the target areas without negatively affecting the view of other objects. Objects that are highly reflective and objects that are not highly reflective remain viewable within the generated images. The methods, thus, provide a clear view of the target areas. The above-described method also minimizes degradation or vision obstruction of a host vehicle operator due to reflection of light off of highly reflective objects.

The present invention provides a technique for actively controlling the illumination pattern provided by a night vision system and/or a headlamp operating system. The present invention minimizes the system costs and complexity with reduced system components. The present invention minimizes the degradation or obstruction of the field-of-view of vehicle operators and thus increases vehicle-operating safety.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An active light source operating system for a vehicle comprising:
   at least one light source generating an initial illumination beam;
   a selective attenuation filter forming an emitted illumination beam having an associated light attenuation matrix, with a plurality of pixels, in response to said initial illumination beam;
   a sensor detecting at least one object and generating an object detection signal; and
   a controller coupled to said selective attenuation filter and said sensor and attenuating at least one of said plurality of pixels in said light attenuation matrix in response to said object detection signal.

2. A system as in claim 1 wherein said at least one light source comprises at least one vehicle headlamp and illuminates an area forward of the vehicle.

3. A system as in claim 1 wherein said sensor in detecting said at least one object detects at least one oncoming illumination beam.

4. A system as in claim 1 wherein said controller attenuates at least one of said plurality of pixels associated with the coordinates of said object.

5. A system as in claim 1 wherein said controller is coupled to and operates said at least one light source continuously in a "high-beam" operating mode.

6. A system as in claim 1 wherein said controller is coupled to and operates said at least one light source in a "high-beam" operating mode regardless of said object detection signal.

7. A system as in claim 1 wherein said controller prevents illumination of at least one of said plurality of pixels in response to said object detection signal.

8. A system as in claim 1 wherein said selective attenuation filter comprises at least one of a liquid crystal display, a digital light projection device, and a liquid crystal on silicon device.

9. A vision system for a vehicle comprising:
at least one light source generating an initial illumination beam;
a selective attenuation filter forming an emitted illumination beam having an associated light attenuation matrix in response to said initial illumination beam;
a receiver generating an environmental status signal in response to at least a reflected portion of said emitted illumination beam; and
a controller coupled to said light source, said selective attenuation filter, and said receiver, said controller actively controlling operation of said selective attenuation filter and generating an image in response to said environmental status signal.

10. A system as in claim 9 wherein said controller detects at least one oncoming illumination beam and attenuates at least one pixel in said light attenuation matrix in response to said environmental status signal.

11. A system as in claim 9 wherein said controller detects at least one oncoming illumination beam and attenuates at least one pixel in said light attenuation matrix, associated with the coordinates of said at least one oncoming illumination beam, in response to said environmental status signal.

12. A system as in claim 9 wherein said controller detects at least one object and attenuates at least one pixel in said light attenuation matrix in response to said environmental status signal.

13. A system as in claim 9 wherein said controller detects at least one object and attenuates at least one pixel in said light attenuation matrix, associated with the coordinates of said at least one oncoming illumination beam, in response to said environmental status signal.

14. A system as in claim 9 wherein said at least one light source comprises a laser.

15. A system as in claim 9 wherein said at least one light source comprises a vehicle headlamp.

16. A system as in claim 9 wherein said selective attenuation filter comprises at least one of a liquid crystal display, a digital light projection device, and a liquid crystal on silicon device.

17. A method of actively controlling at least one illumination source of a vehicle comprising:
generating an initial illumination beam;
forming an emitted illumination beam via a selective attenuation filter having an associated light attenuation matrix in response to said initial illumination beam;
detecting an object and generating an object detection signal; and
attenuating at least one pixel in said light attenuation matrix in response to said object detection signal.

18. A method as in claim 17 further comprising:
generating an image signal in response to at least a reflected portion of said emitted illumination beam; and
attenuating said at least one pixel in response to said image signal.

19. A method as in claim 17 wherein attenuating said at least one pixel comprises generating a pattern of attenuated and non-attenuated pixels on said light attenuation matrix.

20. A method as in claim 17 wherein forming said emitted illumination beam comprises illuminating a first set of selected areas and non-illuminating a second set of selected areas external to the vehicle.

* * * * *